US012686254B2

(12) United States Patent
Nellen et al.

(10) Patent No.: US 12,686,254 B2
(45) Date of Patent: Jul. 21, 2026

(54) GLASS PANEL ASSEMBLY AND ROOF ASSEMBLY OF A VEHICLE PROVIDED THEREWITH

(71) Applicant: INALFA ROOF SYSTEMS GROUP B.V., Oostrum (NL)

(72) Inventors: Marcel Johan Christiaan Nellen, Merselo (NL); Sander De Bie, Nuth (NL); Theodorus Van Doleweerd, Budel-Dorplein (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 330 days.

(21) Appl. No.: 18/605,168

(22) Filed: Mar. 14, 2024

(65) Prior Publication Data

US 2024/0308309 A1 Sep. 19, 2024

(30) Foreign Application Priority Data

Mar. 17, 2023 (CN) .......................... 202310259724.7

(51) Int. Cl.
| | |
|---|---|
| *B60J 7/043* | (2006.01) |
| *B32B 17/10* | (2006.01) |
| *B60J 1/00* | (2006.01) |
| *B60J 10/84* | (2016.01) |
| *B60Q 3/208* | (2017.01) |
| *B60Q 3/62* | (2017.01) |

(52) U.S. Cl.
CPC ......... *B60J 7/043* (2013.01); *B32B 17/10036* (2013.01); *B32B 17/10541* (2013.01); *B60J 1/001* (2013.01); *B60J 10/84* (2016.02); *B60Q 3/208* (2017.02); *B60Q 3/62* (2017.02); *B32B 2307/7376* (2023.05); *B32B 2605/00* (2013.01)

(58) Field of Classification Search
CPC .......... B60J 7/043; B60J 7/0435; B60J 1/001; B60Q 3/208; B60Q 3/62
See application file for complete search history.

(56) References Cited

U.S. PATENT DOCUMENTS

| | | | |
|---|---|---|---|
| 5,613,751 | A | 3/1997 | Parker et al. |
| 5,618,096 | A | 4/1997 | Parker et al. |

(Continued)

FOREIGN PATENT DOCUMENTS

| | | |
|---|---|---|
| CN | 112677880 A | 4/2021 |
| DE | 202014104932 U1 | 1/2015 |

(Continued)

*Primary Examiner* — Alexander K Garlen
(74) *Attorney, Agent, or Firm* — Steven M. Koehler; Westman, Champlin & Koehler, P.A.

(57) ABSTRACT

A glass panel assembly is provided intended for use in a roof assembly of a vehicle. It has a layered glass panel comprising a first glass panel with a first glass panel upper face and an opposite first glass panel lower face and a second glass panel with a second glass panel upper face and an opposite second glass panel lower face. The first glass panel and second glass panel by means of a laminating layer are laminated to each other at the first glass panel lower face and the second glass panel upper face. At least one light incoupling assembly is provided on the second glass panel lower face, which light incoupling assembly comprises at least one light source with light incoupling element. The light incoupling element comprises a rectangular prism.

20 Claims, 4 Drawing Sheets

(56) References Cited

U.S. PATENT DOCUMENTS

| | | | |
|---|---|---|---|
| 5,876,107 | A | 3/1999 | Parker et al. |
| 5,921,652 | A | 7/1999 | Parker et al. |
| 6,079,838 | A | 6/2000 | Parker et al. |
| 2008/0259640 | A1 | 10/2008 | Parker |
| 2008/0259642 | A1 | 10/2008 | Parker |
| 2008/0266899 | A1 | 10/2008 | Parker |
| 2009/0027920 | A1 | 1/2009 | Parker |
| 2009/0034234 | A1 | 2/2009 | Parker |
| 2009/0073719 | A1 | 3/2009 | Parker |
| 2009/0257244 | A1 | 10/2009 | Parker |
| 2011/0051458 | A1 | 3/2011 | Parker |
| 2012/0081919 | A1 | 4/2012 | Parker |
| 2012/0081921 | A1 | 4/2012 | Parker |
| 2013/0213929 | A1 | 8/2013 | Ouderkirk et al. |
| 2015/0009687 | A1 * | 1/2015 | Lin ..................... G02B 6/0028 362/343 |
| 2015/0298601 | A1 * | 10/2015 | Bott ................. B32B 17/10541 362/520 |
| 2018/0001751 | A1 * | 1/2018 | Thannheimer ....... G02B 6/0046 |
| 2019/0001875 | A1 | 1/2019 | Xu et al. |
| 2020/0241189 | A1 | 7/2020 | Schabacker et al. |
| 2020/0384740 | A1 | 12/2020 | Berard et al. |
| 2021/0170724 | A1 | 6/2021 | Hennion et al. |
| 2021/0354622 | A1 | 11/2021 | Spazier |
| 2023/0118480 | A1 | 4/2023 | Pasquarelli |
| 2024/0393525 | A1 * | 11/2024 | Matsushima ......... F21S 43/239 |
| 2025/0222861 | A1 * | 7/2025 | Pasquarelli ............ B60Q 3/208 |

FOREIGN PATENT DOCUMENTS

| | | | |
|---|---|---|---|
| DE | 202018103669 | U1 | 7/2018 |
| DE | 102018008228 | A1 | 4/2020 |
| DE | 102020101813 | A1 | 7/2020 |
| DE | 102022108786 | A1 * | 10/2023 ............... B32B 3/08 |
| DE | 102022128005 | A1 * | 4/2024 ....... B32B 17/10036 |
| DE | 102022131157 | A1 * | 5/2024 ............... B60Q 3/64 |
| EP | 1791010 | A2 | 5/2007 |
| WO | 2021198262 | A1 | 10/2021 |
| WO | 2023031460 | A1 | 3/2023 |
| WO | 2023156939 | A1 | 8/2023 |

* cited by examiner

GLASS PANEL ASSEMBLY AND ROOF ASSEMBLY OF A VEHICLE PROVIDED THEREWITH

CROSS-REFERENCE TO RELATED APPLICATION

The present application is based on and claims the benefit of Chinese patent application Serial No. 202310259724.7, filed Mar. 17, 2023, the content of which is hereby incorporated by reference in its entirety.

BACKGROUND

The discussion below is merely provided for general background information and is not intended to be used as an aid in determining the scope of the claimed subject matter.

The invention generally relates to glass panel assemblies intended for use in roof assemblies of vehicles. In particular the invention relates to such glass panel assemblies which are provided with at least one light incoupling assembly. Such glass panel assemblies, among others, may be used for providing a patterned illumination of the passenger compartment of a vehicle.

It is an object of the present invention to provide an improved glass panel assembly of such a type.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In a first aspect of the present invention, a glass panel assembly is provided which is intended for use in a roof assembly of a vehicle and which has a layered glass panel comprising a first glass panel with a first glass panel upper face and an opposite first glass panel lower face and a second glass panel with a second glass panel upper face and an opposite second glass panel lower face, wherein the first glass panel and second glass panel by means of a laminating layer are laminated to each other at the first glass panel lower face and the second glass panel upper face, and wherein at least one light incoupling assembly is provided on the second glass panel lower face, which light incoupling assembly comprises at least one light source with light incoupling element and wherein the light incoupling element comprises a rectangular prism.

The glass panel assembly in accordance with the present invention combines a number of advantageous features, such as for example a low weight, high strength and very effective light incoupling into the glass panel.

In one embodiment of the glass panel assembly, the rectangular prism mainly is made of ultra clear glass. This optimizes the light incoupling into the glass panel (resulting, among others, in a reduction of loss of light). Ultra clear glass, also referred to as low iron glass, refers to a ferric oxide content in the glass of about 0.01% or less. For low iron glass this may typically be glass with iron <150 PPM (parts per million). It may even be more limited like <100 PPM, or even <80 PPM.

In such an embodiment the rectangular prism preferably is connected to the second glass panel lower face by means of a layer of an optic adhesive. Such an optic adhesive combines the advantageous features of achieving an effective bond between the prism and the second glass panel lower face as well as assuring an effective transmission (incoupling) of light into the second glass panel. The layer of the optic adhesive may extend over the entire respective face of the prism which faces the second glass panel lower face (and in such a case said respective face of the prism preferably will be flat or substantially flat).

For further improving the light incoupling, the layer of an optic adhesive may be an ultra-thin layer. For a glass laminate, glass layers are in the order of about 2.5 mm. And with interlayers, that is layers in between glass layers, of 0.38 mm. In this context, an ultra-thin layer would be less than 1 mm, preferably 0.5 mm, or 0.1 mm.

Basically, the layered glass panel may be of two different types. As a first type, the layered glass panel may be a fixed panel, wherein near to the circumference or perimeter of the second glass panel lower face a glue bead is provided intended for connecting the layered glass panel with, and for defining a watertight seal relative to, a part of the vehicle (for example a frame part of the roof assembly or the so-called body-in-white of the vehicle). (Body-in-white is a term used in the automotive manufacturing industry to describe a car body that has been welded together but is yet to be painted or fitted with some components such as engines, drivetrains, suspension systems, and interior parts.) Thus, in such an embodiment the glass panel has a fixed position relative to the vehicle.

Alternatively, as a second type, the layered glass panel may be a movable panel, wherein the circumference of the second glass panel lower face is intended to directly or indirectly (for example via an encapsulation surrounding at least part of the second glass panel outer edge) cooperate with a seal provided on a part of the vehicle (for example a frame part of the roof assembly or the so-called body-in-white of the vehicle). Such a movable panel for example may be used for closing and opening a roof opening provided in a fixed roof part of the vehicle.

Preferably, the first glass panel and second glass panel, as viewed in a top plan view, are provided with identical or substantially identical outlines. This, among others, has a favorable effect on the overall strength of the layered glass panel.

Further it is conceivable that the first glass panel and the second glass panel have identical or substantially identical thicknesses, for example a thickness of about 2.1 mm.

In yet another embodiment of the glass panel assembly according to the present invention, light outcoupling provisions are provided in a desired pattern at the interface between the second glass panel upper face and laminating layer. Such light outcoupling provisions may assure that the light is visible (for example from inside a passenger compartment of the vehicle) in a desired magnitude and at desired locations (for example for creating a desired light pattern). The light outcoupling provisions may be part of or may be integrated into (or be positioned on top of) the laminating layer and/or of the second glass panel, but also may be separate provisions positioned therebetween. The desired pattern may be such that the provisions are provided according to a local pattern only, but it also is conceivable that such provisions are provided continuously over at least part of the interface.

In a second aspect, the present invention relates to a roof assembly of a vehicle, comprising a frame part surrounding a roof opening in a roof part of the vehicle and a glass panel assembly according to any of the previous claims mounted fixedly or movably in said frame part.

BRIEF DESCRIPTION OF THE DRAWINGS

Hereinafter aspects of the invention will be elucidated while referring to the drawings, in which.

DETAILED DESCRIPTION OF ILLUSTRATIVE EMBODIMENTS

Figure 1:
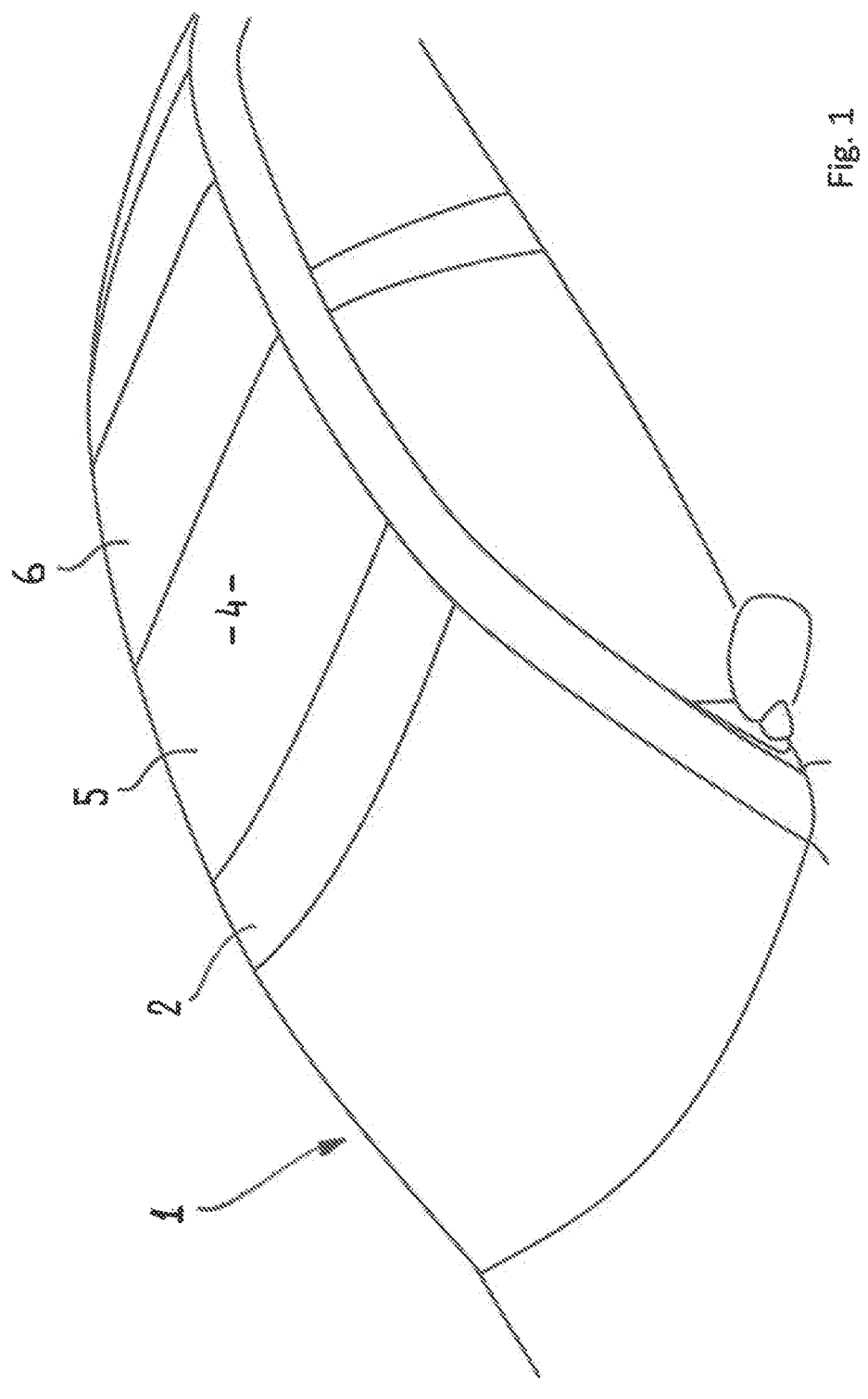
FIG. 1 schematically shows part of a vehicle in which a glass panel assembly in accordance with the invention may be incorporated.

In FIG. 1 a top part of a vehicle 1 is represented which has a fixed roof part 2 to which a frame part 3 (only represented in FIG. 3) is mounted of which inner sides surround (or define) a roof opening 4. One part (for example forward part) of the roof opening 4 is covered by a movable panel 5, whereas the remaining part (for example rear part) of the roof opening is covered by a fixed panel 6.

Figure 2:
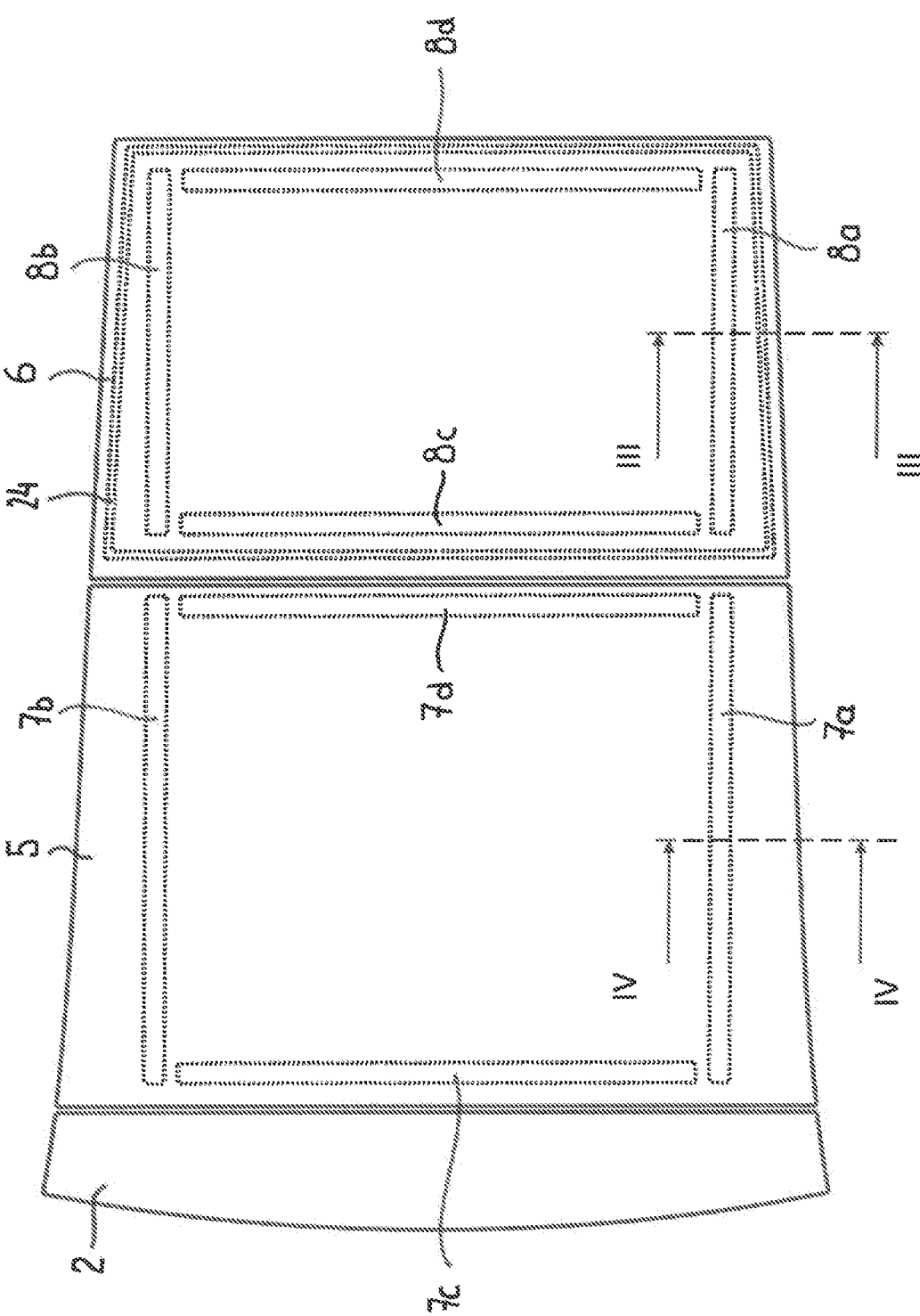
FIG. 2 schematically shows a top plan view of part of the vehicle.

In FIG. 2 the movable panel 5 and fixed panel 6 are schematically represented in their respective positions relative to the fixed roof part 2. Of course, the movable panel 5 may move to another position (for example partly backwards over the fixed panel 6) for at least partly freeing the respective part of the roof opening 4. Mechanisms for achieving such a movement of the movable panel 5 are well-known in the art and thus not further described here.

As an exemplary embodiment, both the movable panel 5 and the fixed panel 6 define layered glass panels which are part of glass panel assemblies in accordance with the present invention and which will be described in detail while referring to FIGS. 3 and 4. It should be noted, however, that in other embodiments also only one of the movable and fixed panels could define such a layered glass panel.

In FIG. 2 light incoupling assemblies 7a-d and 8a-d are indicated schematically in dotted lines. Such light incoupling assemblies may be provided in any desired pattern (for example at all edges of the panels 5, 6 as represented, or for example only at some of the edges, for example only at the lateral edges of the panels, thus only 7a,b and 8a,b, and in a similar manner for both panels or differently for both panels). Although, as schematically represented in FIG. 2, a location of the light incoupling assemblies in the vicinity of the edges of the panels 5, 6 is preferable, also other locations may be conceived.

Figure 3:
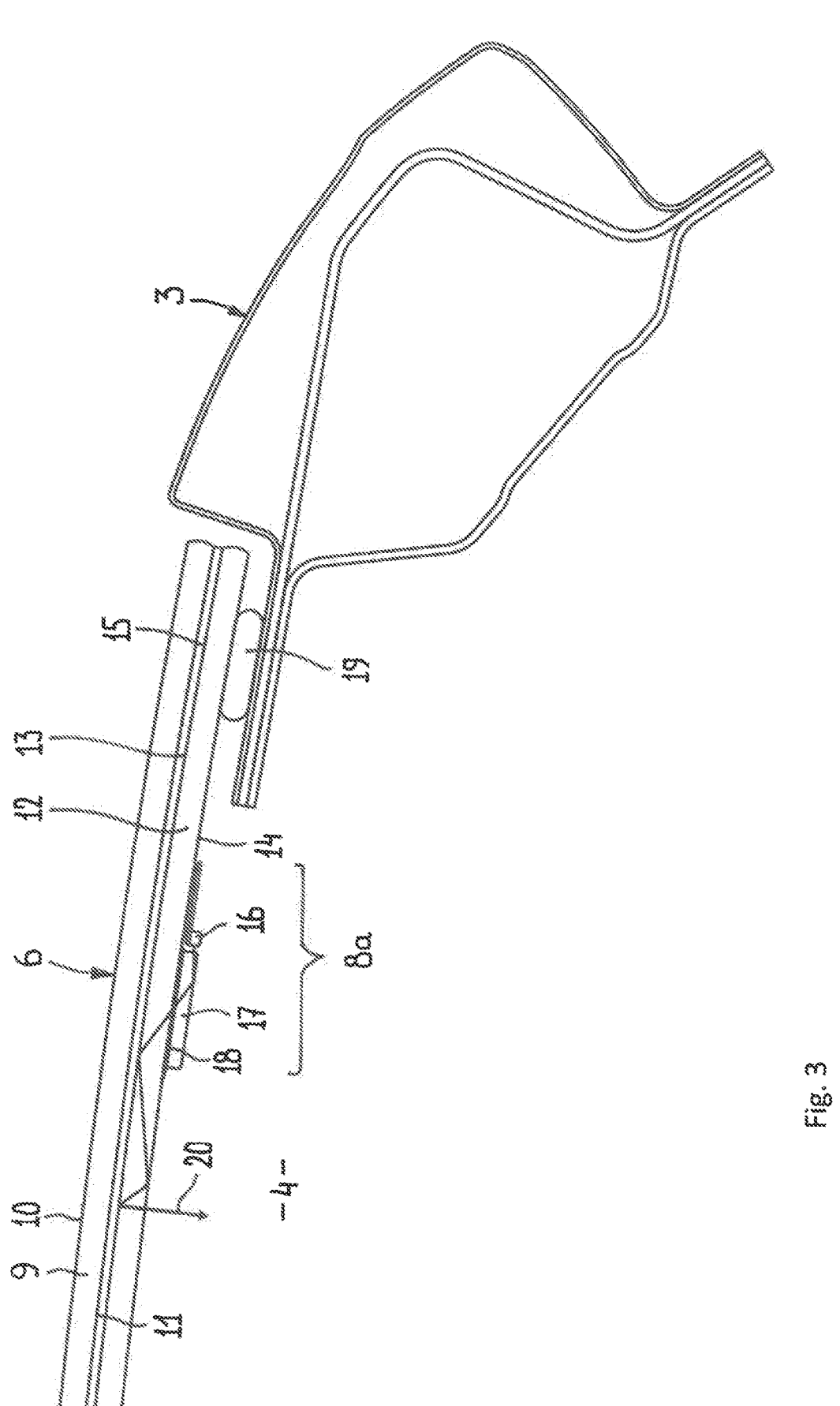
FIG. 3 schematically shows a partial cross section according to III-III in FIG. 2.

For a detailed description of the layered glass panel defining part of the fixed panel 6, reference is made to FIG. 3. The layered glass panel comprises a first (here upper) glass panel 9 with a first glass panel upper face 10 and an opposite first glass panel lower face 11, as well as a second (here lower) glass panel 12 with a second glass panel upper face 13 and an opposite second glass panel lower face 14.

The first glass panel 9 and second glass panel 12 by means of a laminating layer 15 are laminated to each other at the first glass panel lower face 11 and the second glass panel upper face 13. Such a laminating layer 15 may be of any known type and may have properties chosen in accordance with the specific application.

FIG. 3 also shows the light incoupling assembly 8a which is provided on the second glass panel lower face 14. Said light incoupling assembly 8a (as well as any of the other light incoupling assemblies) comprises at least one light source 16 with light incoupling element 17. The light incoupling element 17 specifically comprises a rectangular prism which mainly may be made of ultra clear glass.

In the illustrated embodiment the rectangular prism 17 is connected to the second glass panel lower face 14 by means of a (preferably ultra-thin) layer of an optic adhesive 18. The light source 16 may be attached to the second glass panel 12 in any appropriate manner.

Near to the circumference or perimeter of the second glass panel lower face 14 a glue bead 19 or alike is provided intended for connecting the layered glass panel 6 with, and for defining a watertight seal relative to, a part of the vehicle, such as, in the illustrated embodiment, a frame part 3 which, as stated before, may surround the roof opening 4 (or, as an alternative, the so-called body-in-white).

The first glass panel 9 and second glass panel 12, as viewed in a top plan view, are provided with identical or substantially identical outlines, as partly represented in FIG. 3 by the fact that the right-handed outer edges of the first and second glass panels 9, 12 substantially coincide.

Not illustrated in detail are light outcoupling provisions which may be provided in a desired pattern at the interface between the second glass panel upper face 13 and laminating layer 15, which may assure that light is emitted from the second glass panel 12 at desired locations (as illustrated schematically by arrow 20).

Figure 4:
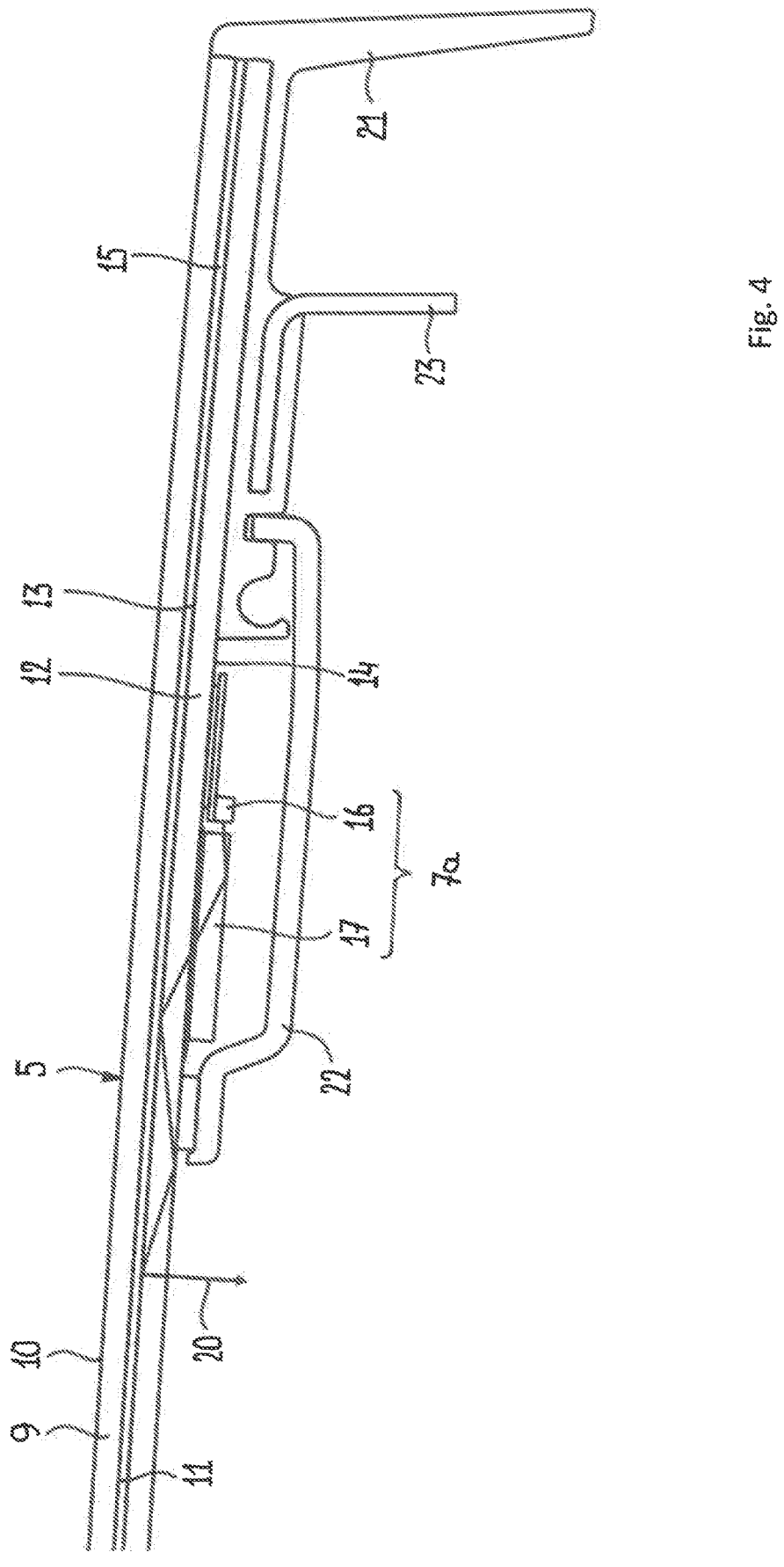
FIG. 4 schematically shows a partial cross section according to IV-IV in FIG. 2.

FIG. 4 basically only differs from FIG. 3 in that the layered glass panel now defines part of a movable panel 5. Components similar to components of the fixed panel 6 according to FIG. 3 have identical reference numbers. The main difference is the provision of an encapsulation 21 at an edge of the movable panel 5 to which a cover element 22 (for hiding the light incoupling assembly 7a from sight) and part of a driving mechanism 23 for the movable panel 5 are attached. A seal 24 (only visible in FIG. 2) may be provided on a part of the vehicle for cooperating with, for example, the encapsulation 21 (or another part of the movable panel 5).

In the embodiments according to FIGS. 3 and 4, the first glass panel 9 and the second glass panel 12 have identical or substantially identical thicknesses, for example a thickness of substantially 2.1 mm. Both panels may be manufactured from identical or different glass materials.

Although the present invention has been described with reference to preferred embodiments, workers skilled in the art will recognize that changes may be made in form and detail without departing from the spirit and scope of the invention.

What is claimed is:

1. A glass panel assembly for use in a roof assembly of a vehicle, the glass panel assembly having a layered glass panel comprising:
   a first glass panel with a first glass panel upper face and an opposite first glass panel lower face;
   a second glass panel with a second glass panel upper face and an opposite second glass panel lower face;
   a laminating layer laminated to each other at the first glass panel lower face and the second glass panel upper face; and
   at least one light incoupling assembly provided on the second glass panel lower face, which light incoupling assembly comprises at least one light source with light incoupling element and wherein the light incoupling element comprises a rectangular prism.

2. The glass panel assembly according to claim 1, wherein the rectangular prism mainly is made of ultra clear glass.

3. The glass panel assembly according to claim 2, wherein the rectangular prism is connected to the second glass panel lower face by a layer of an optic adhesive.

4. The glass panel assembly according to claim 3, wherein the layer of an optic adhesive is an ultra-thin layer.

5. The glass panel assembly according to claim 1, wherein the layered glass panel is a fixed panel and wherein near to a perimeter of the second glass panel lower face a glue bead is provided configured to connect the layered glass panel with, and configured to provide a watertight seal relative to, a part of the vehicle.

6. The glass panel assembly according to claim 1, wherein the layered glass panel is a movable panel and wherein a perimeter of the second glass panel lower face is configured to directly or indirectly cooperate with a seal provided on a part of the vehicle.

7. The glass panel assembly according to claim 1, wherein the first glass panel and second glass panel, as viewed in a top plan view, are provided with identical or substantially identical outlines.

8. The glass panel assembly according to claim 1, wherein the first glass panel and the second glass panel have identical or substantially identical thicknesses.

9. The glass panel assembly according to claim 8, wherein the first glass panel and the second glass panel have a thickness of about 2.1 mm.

10. The glass panel assembly according to claim 1, wherein light outcoupling provisions are provided in a desired pattern at an interface between the second glass panel upper face and the laminating layer.

11. A roof assembly of a vehicle, comprising:
a frame part surrounding a roof opening in a roof part of the vehicle; and
a glass panel assembly having a layered glass panel comprising:
a first glass panel with a first glass panel upper face and an opposite first glass panel lower face;

a second glass panel with a second glass panel upper face and an opposite second glass panel lower face;
a laminating layer laminated to each other at the first glass panel lower face and the second glass panel upper face; and
at least one light incoupling assembly provided on the second glass panel lower face, which light incoupling assembly comprises at least one light source with light incoupling element and wherein the light incoupling element comprises a rectangular prism.

12. The roof assembly according to claim 11, wherein the rectangular prism mainly is made of ultra clear glass.

13. The roof assembly according to claim 12, wherein the rectangular prism is connected to the second glass panel lower face by a layer of an optic adhesive.

14. The roof assembly according to claim 11, wherein the layered glass panel is a fixed panel and wherein near to a perimeter of the second glass panel lower face a glue bead is provided configured to connect the layered glass panel with, and configured to provide a watertight seal relative to, a part of the vehicle.

15. The roof assembly according to claim 14, wherein the said part of the vehicle is a body-in-white of the vehicle.

16. The roof assembly according to claim 11, wherein the layered glass panel is a movable panel and wherein a perimeter of the second glass panel lower face is configured to directly or indirectly cooperate with a seal provided on a part of the vehicle.

17. The roof assembly according to claim 16, wherein the said part of the vehicle is a body-in-white of the vehicle.

18. The roof assembly according to claim 11, wherein the first glass panel and second glass panel, as viewed in a top plan view, are provided with identical or substantially identical outlines.

19. The roof assembly according to claim 11, wherein the first glass panel and the second glass panel have identical or substantially identical thicknesses.

20. The roof assembly according to claim 19, wherein the first glass panel and the second glass panel have a thickness of about 2.1 mm.

* * * * *